US011715847B2

(12) United States Patent
Liu et al.

(10) Patent No.: US 11,715,847 B2
(45) Date of Patent: Aug. 1, 2023

(54) CONNECTION ASSEMBLY FOR USE IN BATTERY MODULE AND BATTERY MODULE

(71) Applicants: Tyco Electronics Japan G.K., Kawasaki (JP); Tyco Electronics (Shanghai) Co., Ltd., Shanghai (CN); Sanyo Electrics Co. Ltd., Osaka-fu (JP)

(72) Inventors: Haifeng Liu, Kanagawa (JP); Litao Dong, Shanghai (CN); Ziwei Li, Shanghai (CN); Mitsuo Akiyama, Shizuoka (JP); Sadamichi Suso, Osaka-fu (JP)

(73) Assignees: Tyco Electronics Japan G.K, Kawasaki (JP); Tyco Electronics (Shanghai) Co., Ltd., Shanghai (CN); Sanyo Electrics Co., Ltd., Osaka-fu (JP)

( * ) Notice: Subject to any disclaimer, the term of this patent is extended or adjusted under 35 U.S.C. 154(b) by 221 days.

(21) Appl. No.: 16/830,953

(22) Filed: Mar. 26, 2020

(65) Prior Publication Data
US 2020/0313140 A1  Oct. 1, 2020

(30) Foreign Application Priority Data
Mar. 28, 2019  (CN) .......................... 201920413046.4

(51) Int. Cl.
*H01M 10/42* (2006.01)
*H01R 11/28* (2006.01)
(Continued)

(52) U.S. Cl.
CPC ....... *H01M 10/425* (2013.01); *H01M 10/486* (2013.01); *H01M 50/271* (2021.01);
(Continued)

(58) Field of Classification Search
CPC combination set(s) only.
See application file for complete search history.

(56) References Cited

U.S. PATENT DOCUMENTS 5,270,702 A * 12/1993 Krolak ................ H01M 50/213
429/100
6,089,973 A * 7/2000 Schultz .................. A01G 9/242
454/364
(Continued)

FOREIGN PATENT DOCUMENTS

CN    110212264 A  *  9/2019  ............. B01D 46/10

*Primary Examiner* — Amanda J Barrow

(57) ABSTRACT

Disclosed are a connection assembly for a battery module and a battery module. The connection assembly for a battery module has a housing body, a cover plate and an openable and closable door, wherein the housing body is used for supporting a plurality of components; the cover plate covers the housing body and used for covering the plurality of components on the housing body; the cover plate is provided with a second through-hole, and the second through-hole positionally corresponds to at least one of the plurality of components; the openable and closable door is movably mounted on the cover plate, and is positionally changeable between an open position and a closed position; wherein in the open position, the openable and closable door opens the second through-hole to expose the at least one of the plurality of components; and in the closed position, the openable and closable door shields at least part of the second through-hole to cover the at least one of the plurality of components on the body. A contact state between a temperature sensor and a cell can be examined by means of the second through-hole.

20 Claims, 16 Drawing Sheets

(51) Int. Cl.
  *H01M 50/581* (2021.01)
  *H01M 10/48* (2006.01)
  *H01M 50/271* (2021.01)
  *H01M 50/505* (2021.01)
  *H01M 50/531* (2021.01)
  *H01M 50/15* (2021.01)
  *H01M 50/209* (2021.01)

(52) U.S. Cl.
  CPC ....... *H01M 50/505* (2021.01); *H01M 50/581* (2021.01); *H01R 11/288* (2013.01); *H01M 50/15* (2021.01); *H01M 50/209* (2021.01); *H01M 50/531* (2021.01)

(56) References Cited

U.S. PATENT DOCUMENTS

| | | | |
|---|---|---|---|
| 6,891,347 B2 * | 5/2005 | Dobbs | G06F 1/206 388/903 |
| 8,424,194 B2 * | 4/2013 | Blumka | H01M 10/0468 29/730 |
| 2003/0213715 A1 * | 11/2003 | Klepac | B65D 85/50 206/524.8 |
| 2008/0278183 A1 * | 11/2008 | McClelland | H01M 8/04507 324/721 |
| 2013/0037336 A1 * | 2/2013 | Ojeda | B60K 1/04 180/68.5 |
| 2015/0184401 A1 * | 7/2015 | Steck | E04G 1/15 182/222 |
| 2016/0312968 A1 * | 10/2016 | Brunelli | F21V 21/28 |
| 2018/0013116 A1 * | 1/2018 | Dorr | B65D 73/0014 |
| 2018/0123097 A1 * | 5/2018 | Jo | B65D 43/163 |
| 2018/0166752 A1 * | 6/2018 | Ng | H01M 10/0525 |
| 2018/0170209 A1 * | 6/2018 | Maguire | H01M 50/20 |
| 2018/0301765 A1 * | 10/2018 | Knape | G01R 31/3644 |
| 2019/0006647 A1 * | 1/2019 | Ryu | H01M 50/211 |
| 2019/0044753 A1 * | 2/2019 | Neeld | G06Q 10/087 |
| 2019/0181509 A1 * | 6/2019 | Ohtsuka | H04N 5/2251 |

* cited by examiner

CONNECTION ASSEMBLY FOR USE IN BATTERY MODULE AND BATTERY MODULE

TECHNICAL FILED

The present application relates to a connection assembly for a battery module, and a battery module.

BACKGROUND

An existing connection assembly for a battery module generally comprises a housing body, a cover plate and a temperature sensor. The housing body is mounted on a cell. The temperature sensor is configured to pass through the housing body and is used for detecting the temperature of the cell. When the cover plate covers the housing body, the temperature sensor is pressed against a surface of the cell, so that the temperature sensor comes into full contact with the surface of the cell to detect the temperature of the cell. The cover plate covers the housing body, a mounting position and a state of the temperature sensor, in particular a contact state between the temperature sensor and the cell, cannot be observed in real time. As a result, it cannot be ensured that the temperature sensor comes into contact with the cell, and consequently, the temperature sensor cannot reliably and accurately detect the temperature of the cell.

SUMMARY OF THE INVENTION

One of the objectives of the present application is to provide a connection assembly for a battery module and a battery module in which a mounting position of a temperature sensor can be observed, in order to overcome at least one of deficiencies in the prior art.

According to an aspect of the present application, a connection assembly for a battery module is provided. The connection assembly comprises a housing body, the housing body being used for supporting a plurality of components; a cover plate, the cover plate covering the housing body and used for covering the plurality of components on the housing body, the cover plate being provided with a second through-hole, and the second through-hole positionally corresponding to at least one of the plurality of components; and an openable and closable door, the openable and closable door being movably mounted on the cover plate, and being positionally changeable between an open position and a closed position; wherein in the open position, the openable and closable door opens the second through-hole to expose the at least one of the plurality of components; and in the closed position, the openable and closable door shields at least part of the second through-hole to cover the at least one of the plurality of components on the housing body.

According to an embodiment of the connection assembly, the cover plate and the openable and closable door are integrated as a single piece; one end of the openable and closable door is connected to the cover plate via a bendable portion, and the other end thereof is danglingly arranged; and the bendable portion is configured to be bendable to deform, such that the openable and closable door moves relative to the cover plate.

According to an embodiment of the connection assembly, the bendable portion is sheet-shaped, and the bendable portion has a thickness smaller than that of the openable and closable door.

According to an embodiment of the connection assembly, one bendable portion is provided.

According to an embodiment of the connection assembly, at least two bendable portions are provided; and the at least two bendable portions are arranged at intervals in the length direction of the openable and closable door.

According to an embodiment of the connection assembly, the at least two bendable portions are configured to enable the openable and closable door to rotate to the open position where an included angle larger than 180 degrees is formed between the openable and closable door and the second through-hole; and the other end of the openable and closable door is connected to the cover plate.

According to an embodiment of the connection assembly, a slot is provided in the cover plate; and in the open position, the other end of the openable and closable door is inserted into the slot.

According to an embodiment of the connection assembly, the slot is U-shaped, forming a pair of elastic cantilevers; and in the open position, the elastic cantilever is elastically deformed, such that the openable and closable door is pressed against an inner surface of the slot.

According to an embodiment of the connection assembly, in the closed position, the openable and closable door is arranged to be flush with the cover plate.

According to an embodiment of the connection assembly, the connection assembly further comprises a fixing structure, wherein the fixing structure connects the openable and closable door with the housing body or the cover plate to prevent the openable and closable door from rotating towards the outside of the second through-hole.

According to an embodiment of the connection assembly, the fixing structure comprises a snap fastener; and in the closed position, the openable and closable door is connected to the housing body via the snap fastener to prevent the openable and closable door from rotating towards the outside of the second through-hole.

According to an embodiment of the connection assembly, the openable and closable door is protrudingly provided with an elastic hook; a blocking portion is arranged on the housing body; and in the closed position, the blocking portion is snap-fitted with the elastic hook to prevent the openable and closable door from rotating towards the outside of the second through-hole.

According to an embodiment of the present application, the connection assembly further comprises a temperature sensor supported on the housing body for sensing the temperature of a cell, wherein the position of the temperature sensor is aligned with the position of the second through-hole.

According to an embodiment of the connection assembly, the housing body is provided with a first through-hole arranged to pass through the housing body, and correspond to the second through-hole. The temperature sensor is at least partially located in the first through-hole to sense the temperature of a cell.

According to an embodiment of the present application, the connection assembly further comprises an elastic member, wherein the elastic member is arranged on the temperature sensor; in the open position, the openable and closable door is opened such that a part of the elastic member passes out of the second through-hole; and in the closed position, the elastic member is located between the temperature sensor and the openable and closable door; and the openable and closable door elastically deforms the elastic member, so as to press the temperature sensor to come into contact with the cell and detect the temperature of the cell.

According to an embodiment of the connection assembly, the elastic member is a foam material.

According to an embodiment of the connection assembly, the temperature sensor is fixedly connected to the elastic member.

According to an embodiment of the connection assembly, the housing body is protrudingly provided with a positioning bracket; and the positioning bracket retains the elastic member.

According to an embodiment of the connection assembly, the cover plate and the openable and closable door are integrally molded as a single piece.

According to another aspect of the present application, a battery module is provided. The battery module comprises: a plurality of cells; and the connection assembly as described above, wherein the plurality of cells are electrically connected via the connection assembly to form the battery module.

According to an embodiment of the present application, the battery module further comprises a busbar, wherein the plurality of cells are connected in series or parallel via the busbar to form the battery module; and each of the cells is provided with a positive terminal and a negative terminal electrically connected to the busbar.

According to an embodiment of the present application, the battery module further comprises a power supply terminal, the power supply terminal being electrically connected to the plurality of cells via the busbar.

According to an embodiment of the present application, the battery module is a battery module for use in an electric vehicle.

Compared with the prior art, in a connection assembly for the battery module and the battery module provided in the present application, when an openable and closable door is in an open position, mounting positions and states of a temperature sensor and an elastic member, in particular a contact state between the temperature sensor and a cell, can be examined through an opened second through-hole. When the openable and closable door is in a closed position, it can be ensured that the temperature sensor is in full contact with the cell to reliably detect the temperature of the cell. The openable and closable door and a cover plate may be integrated as a single piece, so that the quantity of parts to be assembled is reduced, and the mounting procedure is simplified. The openable and closable door in the closed position is not higher than the cover plate, and the overall height of the battery module can be set to be smaller.

By providing at least two bendable portions, an included angle larger than 180 degrees can be formed between the openable and closable door in the open position and the second through-hole. The openable and closable door occupies a small space in a height direction, so that the overall height of the battery module can be reduced. The openable and closable door and the cover plate may even be substantially located in the same plane in the height direction, so that the overall height of the battery module is further reduced.

In the open position, two ends of the openable and closable door are both connected to the cover plate and are fixedly arranged. In transportation and assembly procedures, the openable and closable door is fixed onto the cover plate and does not move freely to affect other components.

Exemplary embodiments of the present application will be described below in detail with reference to the accompanying drawings, and further features and advantages of the present application will become clear.

wherein, 100: battery module; 10: cell; 20: housing body; 22: first through-hole; 24: positioning bracket; 26: blocking portion; 30: cover plate; 31: second through-hole; 32: slot; 33: elastic cantilever; 34: bendable portion; 36: openable and closable door; 38: elastic hook; 40: temperature sensor; 42: printed circuit board; 44: elastic member; 50: busbar; 60: power supply terminal.

DETAILED DESCRIPTION OF EMBODIMENTS

The application will be further explained below in detail with reference to the accompanying drawings.

Embodiment 1

Figure 1:
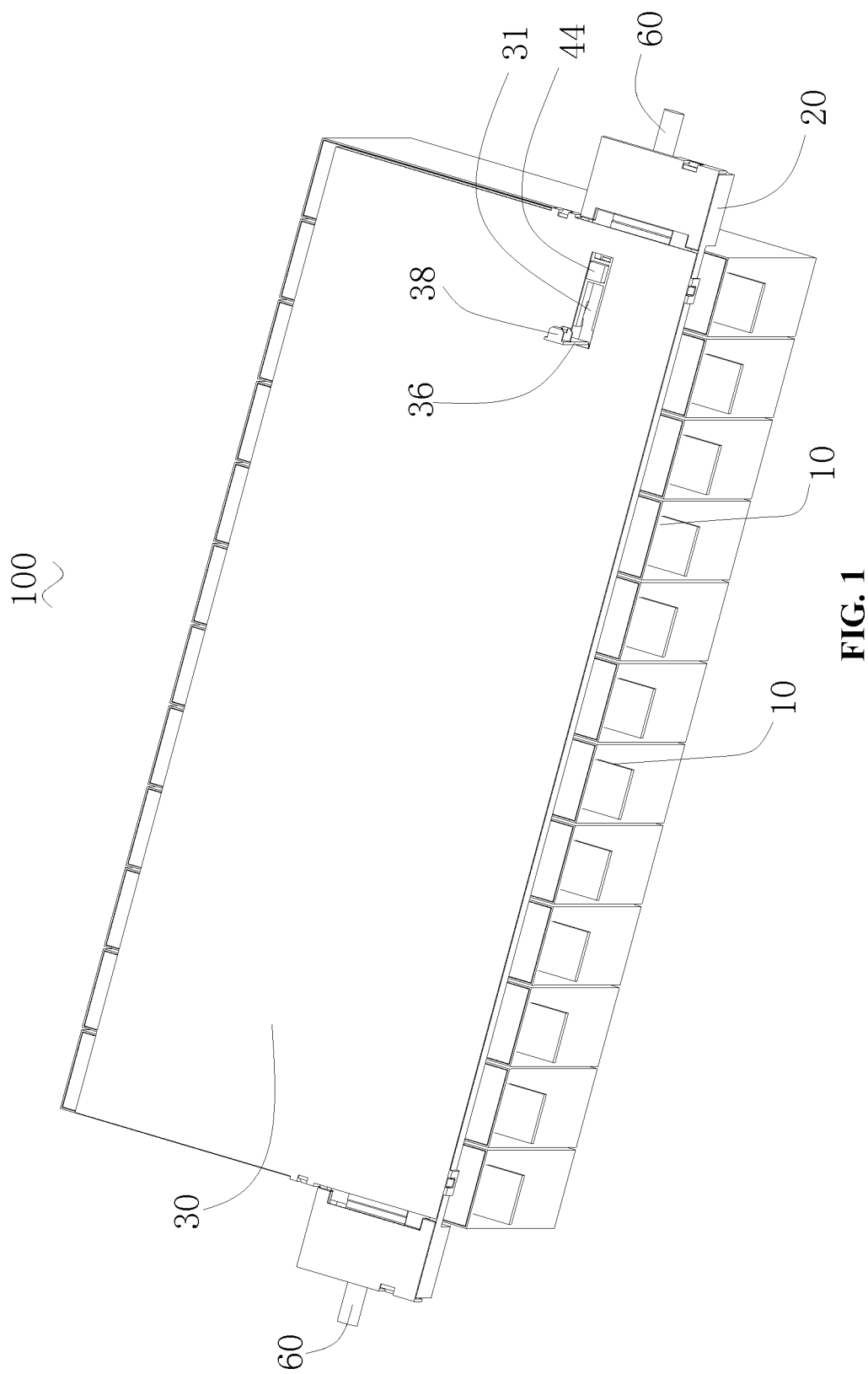
FIG. 1 is a schematic structural diagram of a battery module according to Embodiment 1 of the present application.
Figure 2:
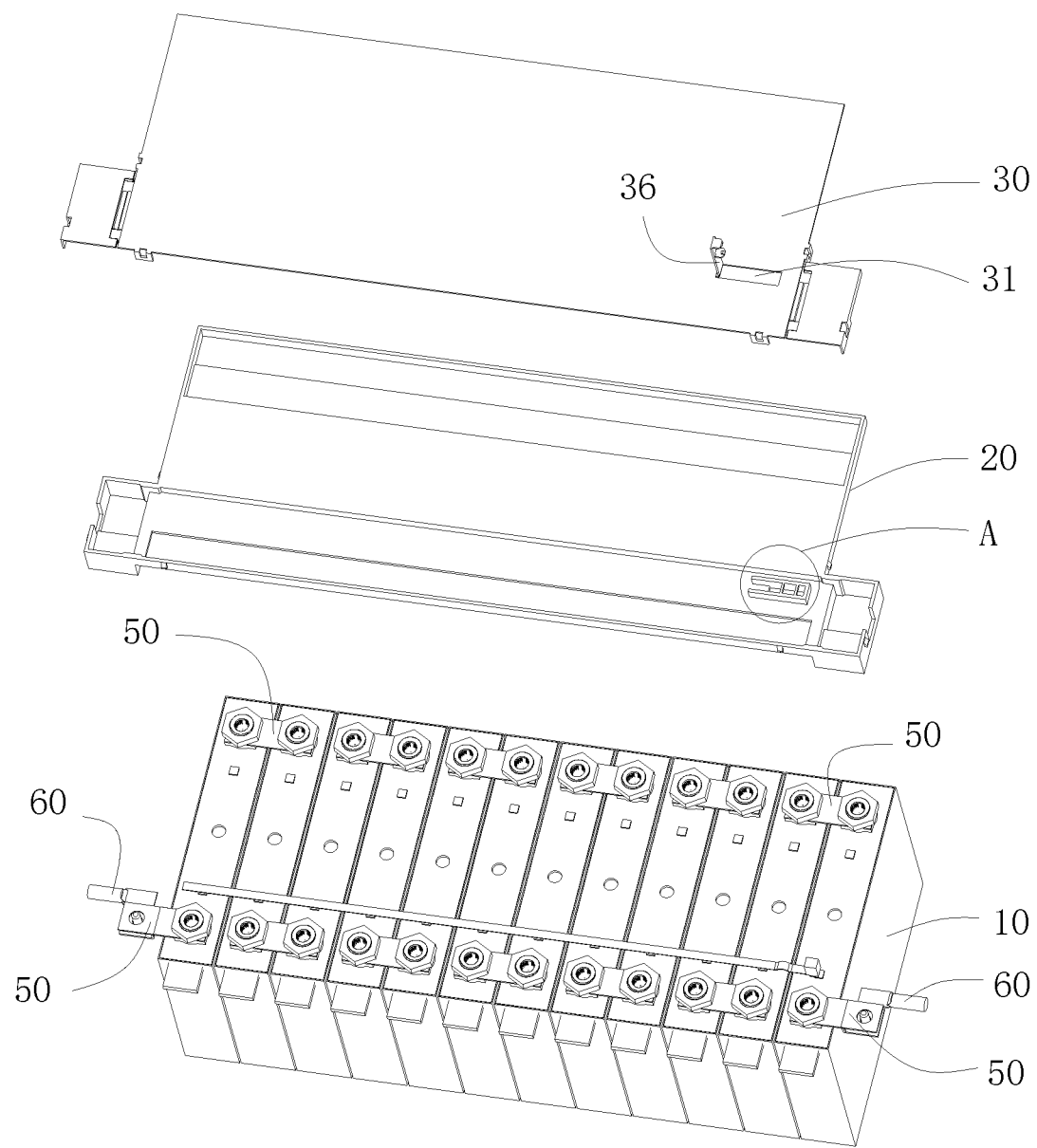
FIG. 2 is an exploded view of parts of the battery module in FIG. 1.
Figure 6:
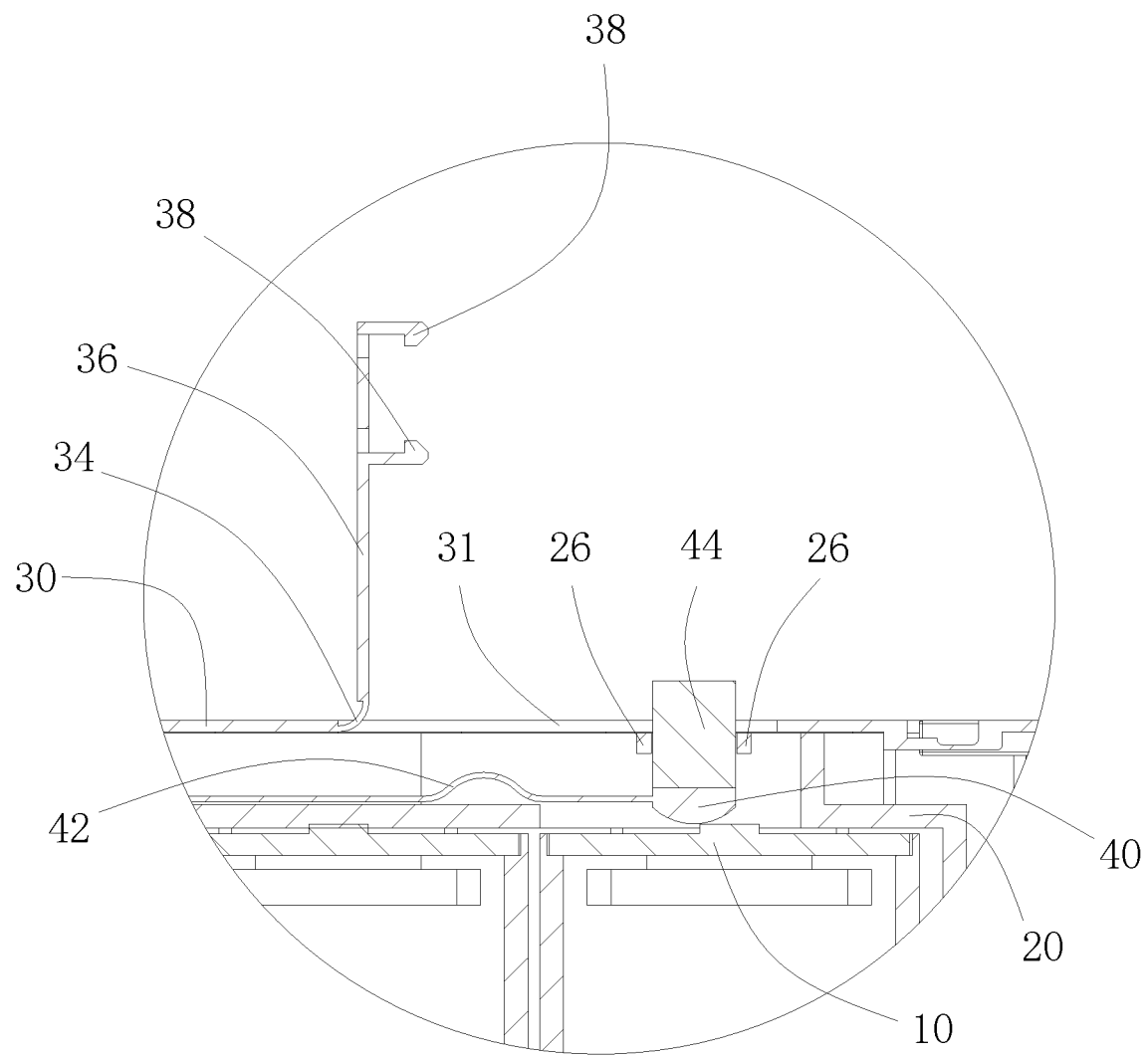
FIG. 6 is an enlarged schematic view at C in FIG. 5.
Figure 7:
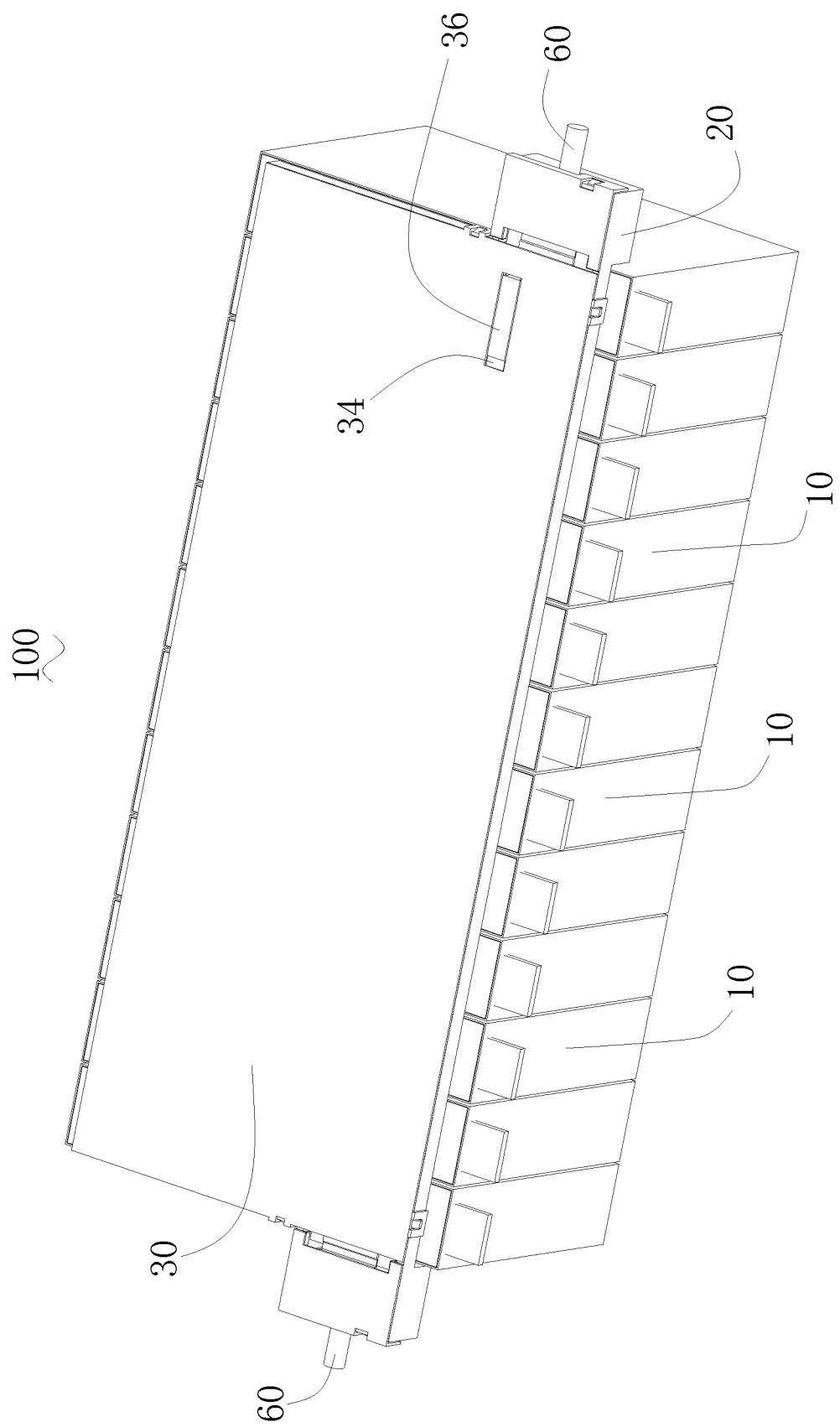
FIG. 7 is a schematic structural diagram with an openable and closable door of the battery module in FIG. 1 being in a closed position.

Referring to FIGS. 1, 2, and 6, a battery module 100 according to Embodiment 1 of the present application is shown. The battery module 100 comprises a cell 10, a busbar 50, a power supply terminal 60, a temperature sensor 40, an elastic member 44 and a case. A plurality of cells 10 are provided. The plurality of cells 10 are fixedly connected together and are connected in series or in parallel to be one power supply. In this embodiment, the plurality of cells 10 are sequentially arranged and fixedly connected together. Every adjacent two cells 10 are electrically connected in series via the busbar 50 to form one power supply. Each of the cells 10 has a positive electrode and a negative electrode. The positive and negative electrodes of the cell 10 are provided with a positive terminal and a negative terminal to be electrically connected to the busbar 50, respectively.

The power supply has a positive electrode and a negative electrode. The power supply terminal 60 is connected to the positive and negative electrodes of the power supply via the busbar 50 and is used for implementing the function of charging and discharging and storing electricity. In this embodiment, the power supply terminal 60 comprises a positive terminal and a negative terminal. The positive terminal is electrically connected to the positive electrode of the power supply, and the negative terminal is electrically connected to the negative electrode of the power supply.

The battery module 100 is rechargeable and can be repeatedly used. The battery module 100 comprises a high voltage electrical signal. The case can insulate a conductive assembly comprising the power supply terminal 60, the busbar 50, and the like. The battery module 100 in this embodiment may be applied to an electric vehicle for powering the electric vehicle.

The temperature sensor 40 is arranged to be capable of coming into contact with a cell 10 and is used for detecting the temperature of the cell 10. For example, the temperature sensor 40 is directly arranged to be connected to the cell 10 to enable contact, or may come into contact with the cell 10 via other structures. The elastic member 44 is arranged on the temperature sensor 40. The elastic member 44 has desirable elasticity and will elastically deform when being pressed by an external force, so that a force in a direction towards the cell 10 is applied to the temperature sensor 40 to press the temperature sensor 40 against a surface of the cell 10 to be in contact with the cell 10. The elastic member 44 is fixedly connected to the temperature sensor 40. For example, the temperature sensor 40 may be fixedly connected to the elastic member 44 in a bonding manner, a snap-fit manner, or the like. In this embodiment, the elastic member 44 is a foam material. The temperature sensor 40 is bonded to an end of the foam material in the length direction. Certainly, in other embodiments, the elastic member may also be arranged as a spring, an air cushion or other elastic members.

Figure 3:
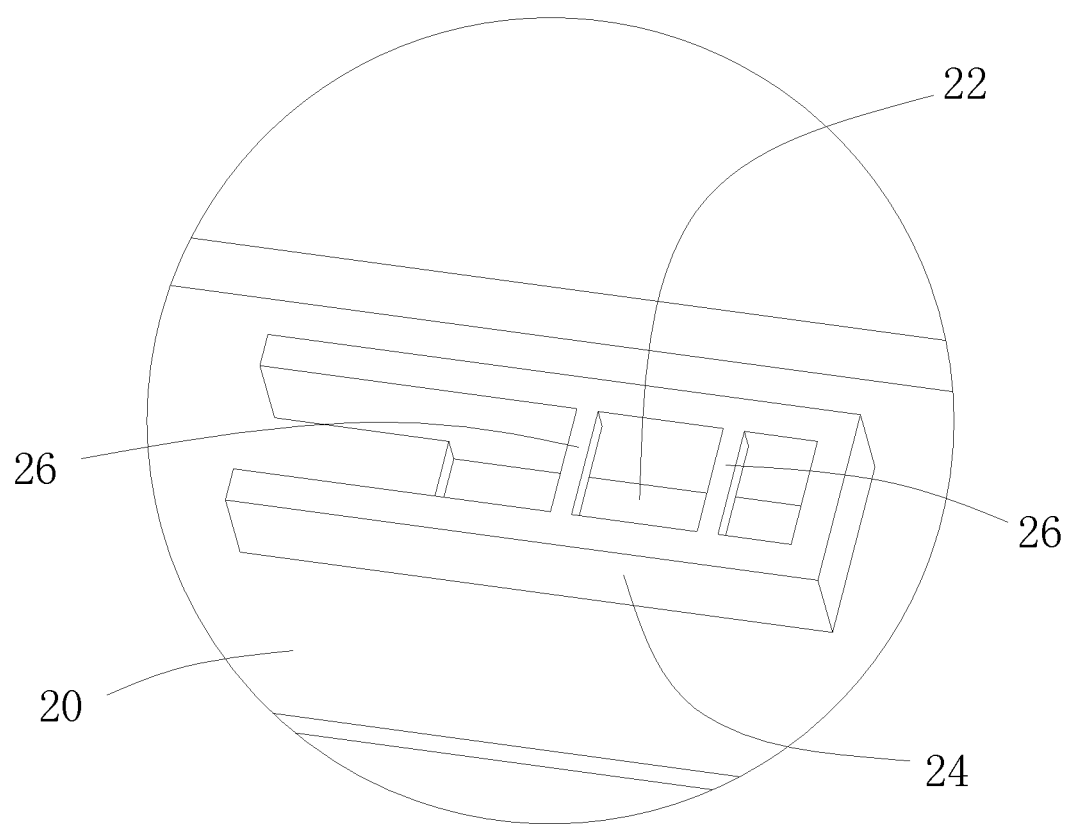
FIG. 3 is an enlarged schematic view at A in FIG. 2.

Referring to FIGS. 2 and 3, the case comprises a housing body 20, a cover plate 30 and an openable and closable door 36. The housing body 20 is arranged on the plurality of cells 10 and is used for connecting the plurality of cells 10 together. The housing body 20 is further used for supporting a plurality of components, for example, the temperature sensor. The housing body 20 is provided with a first through-hole 22. The first through-hole 22 is arranged to pass through the housing body 20 and to be in communication with the surface of the cells 10. The cover plate 30 is used to cover the housing body 20 and used for covering the components on the housing body 20. When the cover plate 30 covers the housing body 20, a receiving cavity is defined. The first through-hole 22 is connected to the receiving cavity. The cover plate 30 is provided with a second through-hole 31. The second through-hole 31 is connected to the receiving cavity. The second through-hole 31 is arranged in a position corresponding to the first through-hole 22. The temperature sensor 40 is at least partially located in the first through-hole 22. The elastic member 44 is arranged on the temperature sensor 40 and is at least partially located in the receiving cavity. The temperature sensor 40 may be electrically connected to a printed circuit board 42 to transmit a temperature signal. For example, the printed circuit board 42 may be at least partially arranged in the first through-hole 22.

The openable and closable door 36 may be rotatably mounted on the cover plate 30, and the openable and closable door 36 and the cover plate 30 are integrally molded as a single piece. The openable and closable door 36 is rotatable relative to the cover plate 30. The openable and closable door 36 has an open position and a closed position. As the openable and closable door 36 rotates relative to the cover plate 30, the openable and closable door 36 is rotatable from the open position to the closed position.

Figure 4:
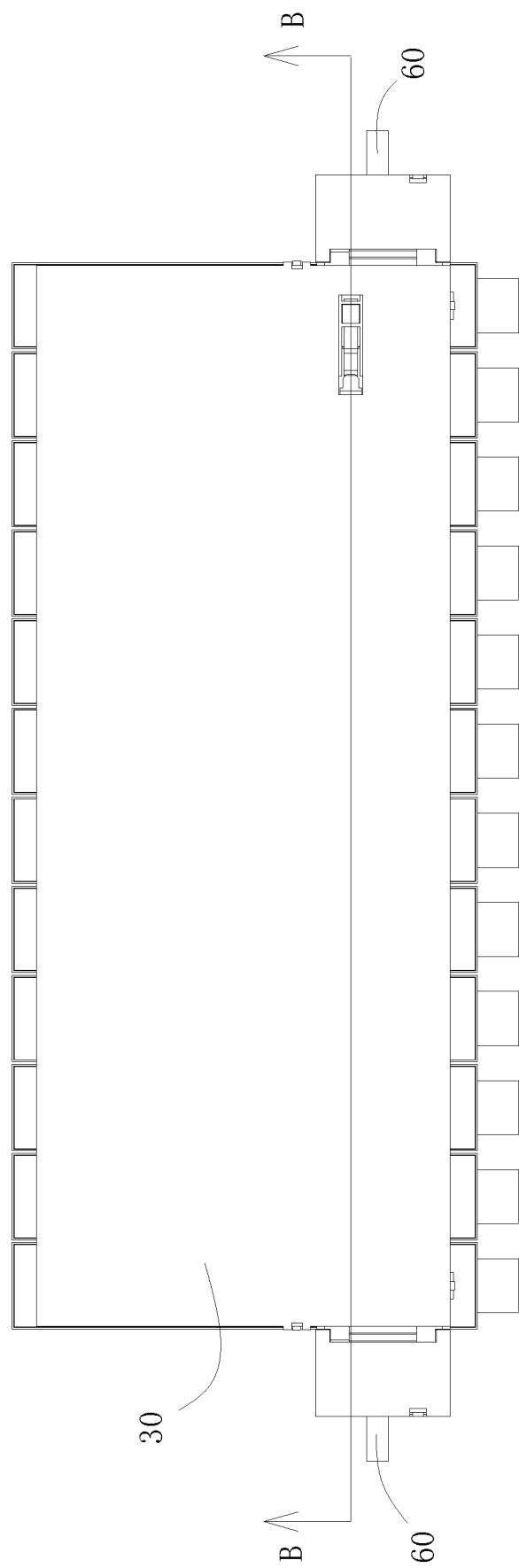
FIG. 4 is a top view of the battery module in FIG. 1.
Figure 5:
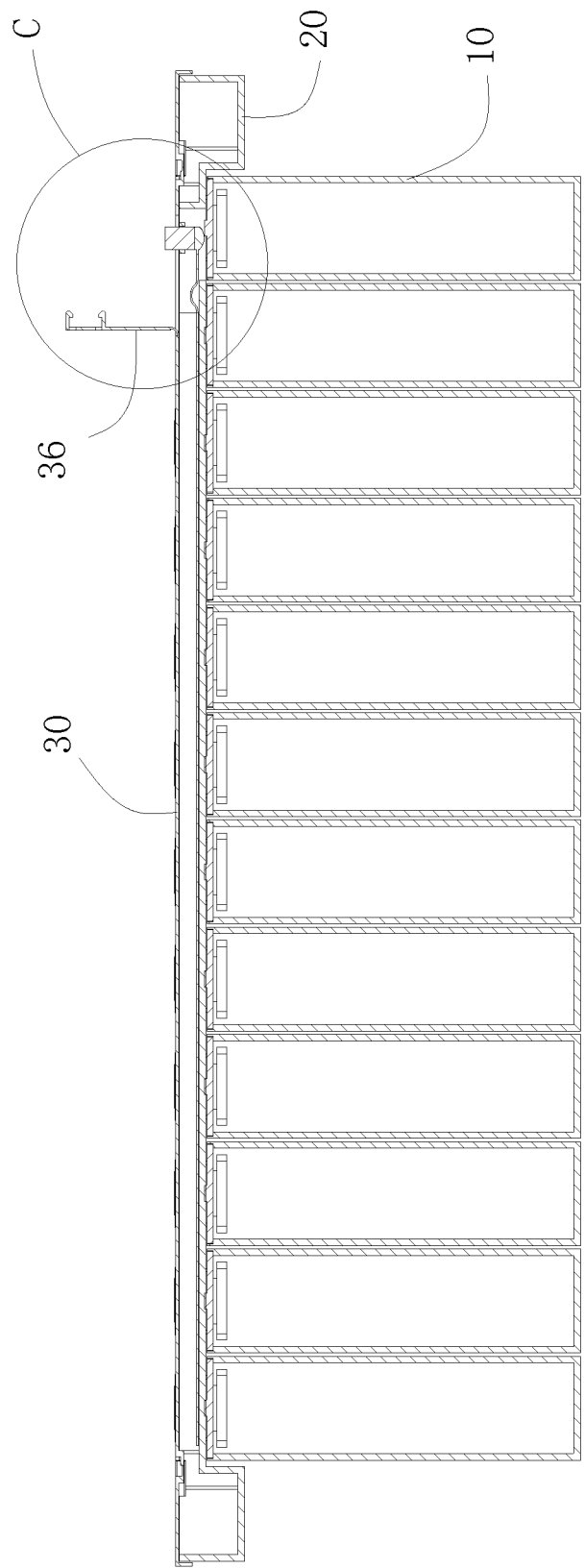
FIG. 5 is a sectional view taken along a direction B-B in FIG. 4.

Referring to FIG. 4 to FIG. 6, when the openable and closable door 36 is in the open position, the openable and closable door 36 is located outside the second through-hole 31, opens the second through-hole 31, and unblock the second through-hole 31 to expose the components. Because the first through-hole 22 and the second through-hole 31 are arranged correspondingly, in the open position, one end of the elastic member 44 is arranged on the temperature sensor 40, and the other end thereof passes out of the second through-hole 31.

Referring to FIG. 7 to FIG. 10, when the openable and closable door 36 is in the closed position, the openable and closable door 36 at least partially blocks the second through-hole 31 and covers the components on the housing body 20. The openable and closable door 36 is connected to the housing body 20 or the cover plate 30 to prevent the openable and closable door 36 from rotating towards the outside of the second through-hole 31. When the openable and closable door 36 is rotated from the open position to the closed position, the elastic member 44 is pressed to enable the elastic member 44 to stay elastically deformed, and the elastic member 44 applies a force in a direction towards the cell 10 to the temperature sensor 40 to press the temperature sensor 40 against the surface of the cell 10. The temperature sensor 40 is in full contact with the cell 10 to detect the temperature of the cell 10. When the detected temperature of the cell 10 is relatively high, a corresponding safety measure may be adopted.

In the open position, the openable and closable door 36 does not block the second through-hole 31. The position of the temperature sensor 40 is aligned with the position of the second through-hole 31. Therefore, mounting positions and states of the temperature sensor 40 and the elastic member 44 may be examined through the opened second through-hole 31, so that it can be ensured that when the openable and closable door 36 is rotated to the closed position, the temperature sensor 40 is in full contact with the cell 10 to reliably detect the temperature of the cell 10.

In a specific implementation, the temperature sensor 40 is fixedly connected to the elastic member 44. The temperature sensor 40 and the elastic member 44 are placed on the surface of the cell 10. The housing body 20 is arranged on the cell 10. The cover plate 30 is used to cover the housing body 20. The openable and closable door 36 is in the open position. The temperature sensor 40 is located in the first through-hole 22, a part of the elastic member 44 is located in the receiving cavity, and a part thereof passes out of the second through-hole 31. Subsequently, the mounting positions and states of the temperature sensor 40 and the elastic member 44 are observed through the second through-hole 31. If a detection result meets a requirement, the openable and closable door 36 is rotated to the closed position, and it can be ensured that the temperature sensor 40 can be in full contact with the cell 10 to reliably and accurately detect the temperature of the cell 10. If the detection result does not meet a requirement, the temperature sensor 40 and the elastic member 44 may be mounted again or the mounting positions of the temperature sensor 40 and the elastic member 44 may be adjusted. In the closed position, the elastic member 44 is located between the openable and closable door 36 and the temperature sensor 40.

Figure 10:
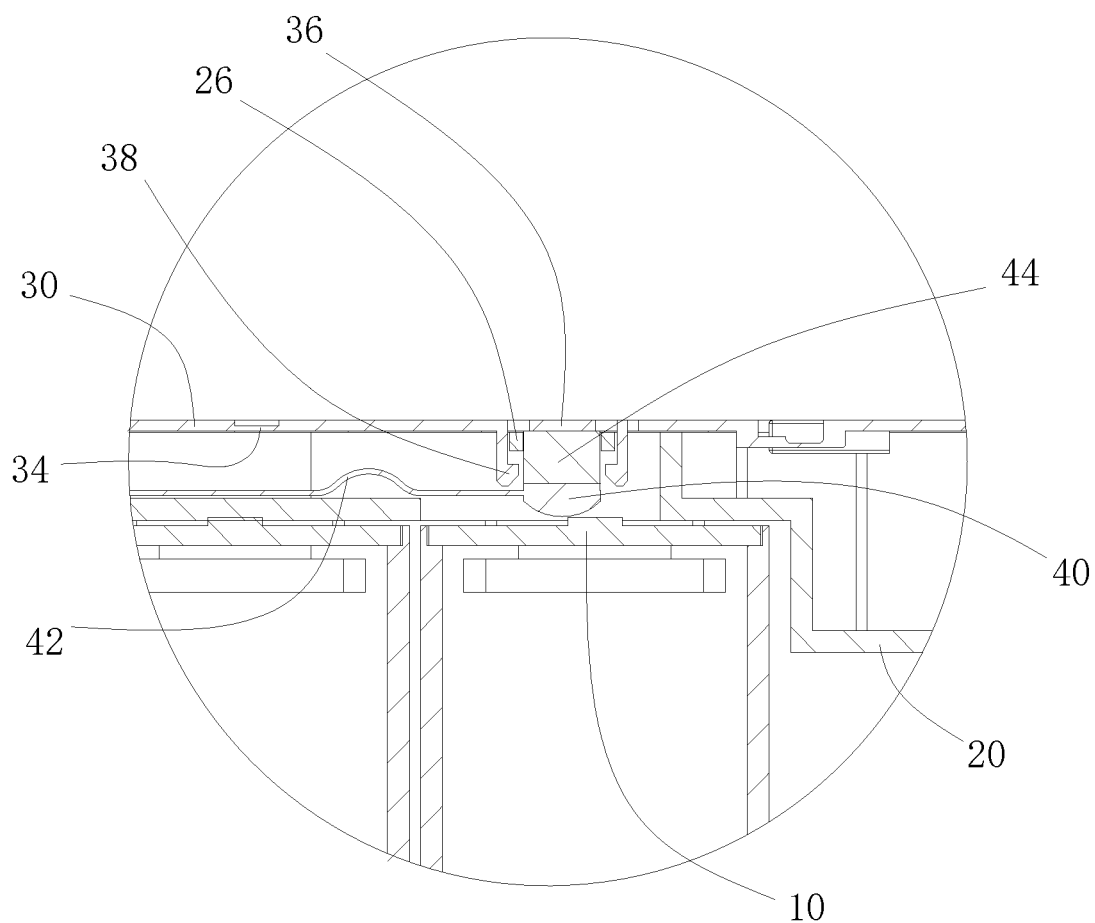
FIG. 10 is an enlarged schematic view at E in FIG. 9.
Figure 11:
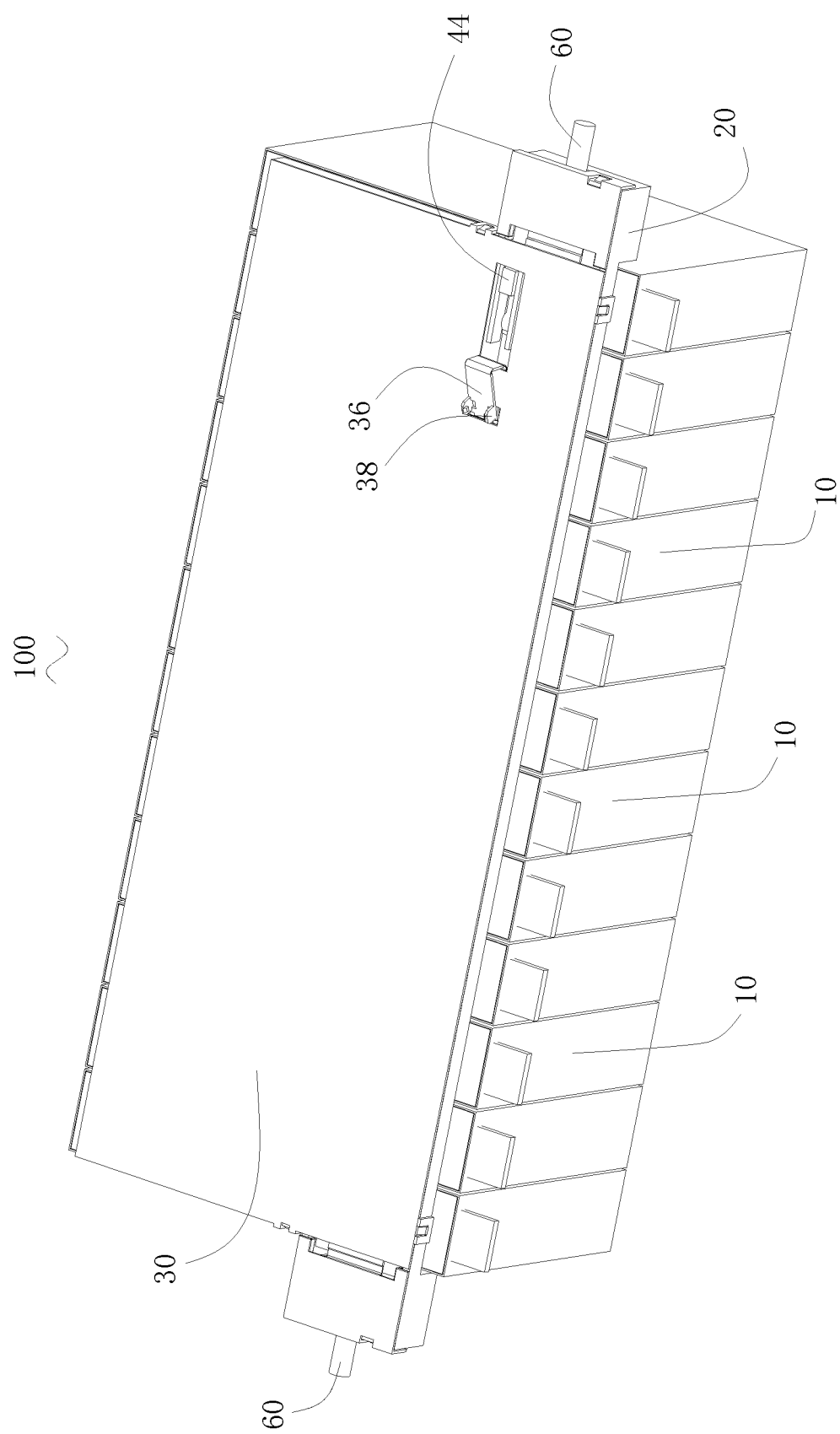
FIG. 11 is a schematic structural diagram of a battery module according to Embodiment 2 of the present application.
Figure 12:
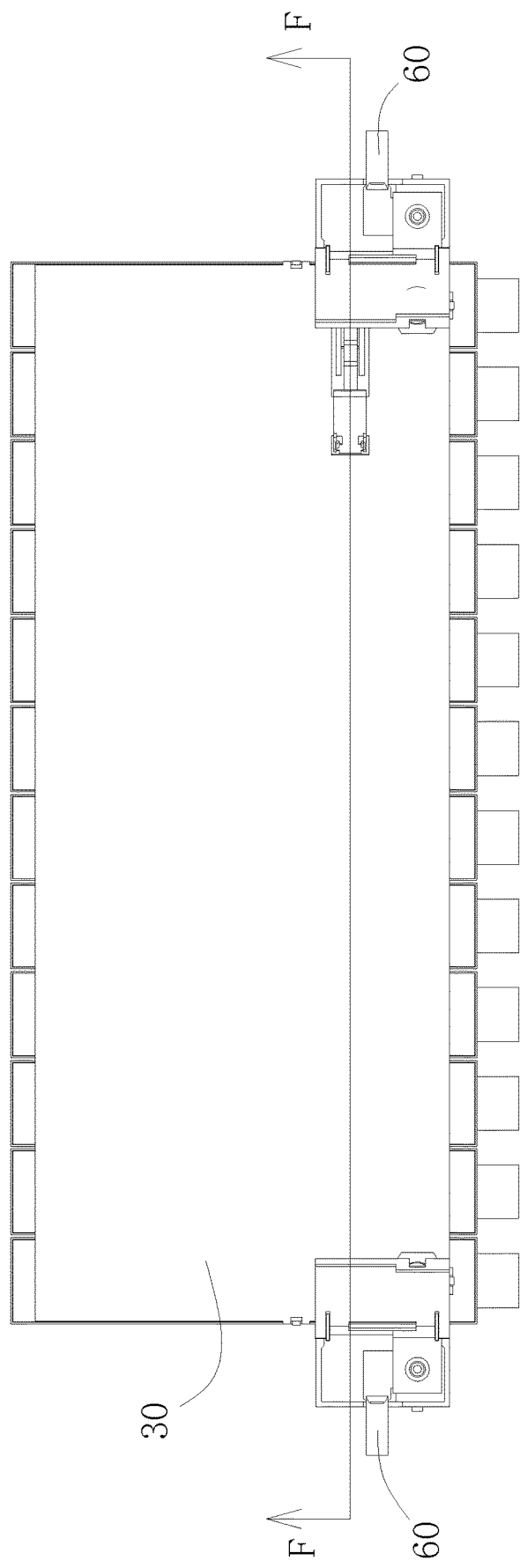
FIG. 12 is a top view of the battery module in FIG. 11.
Figure 13:
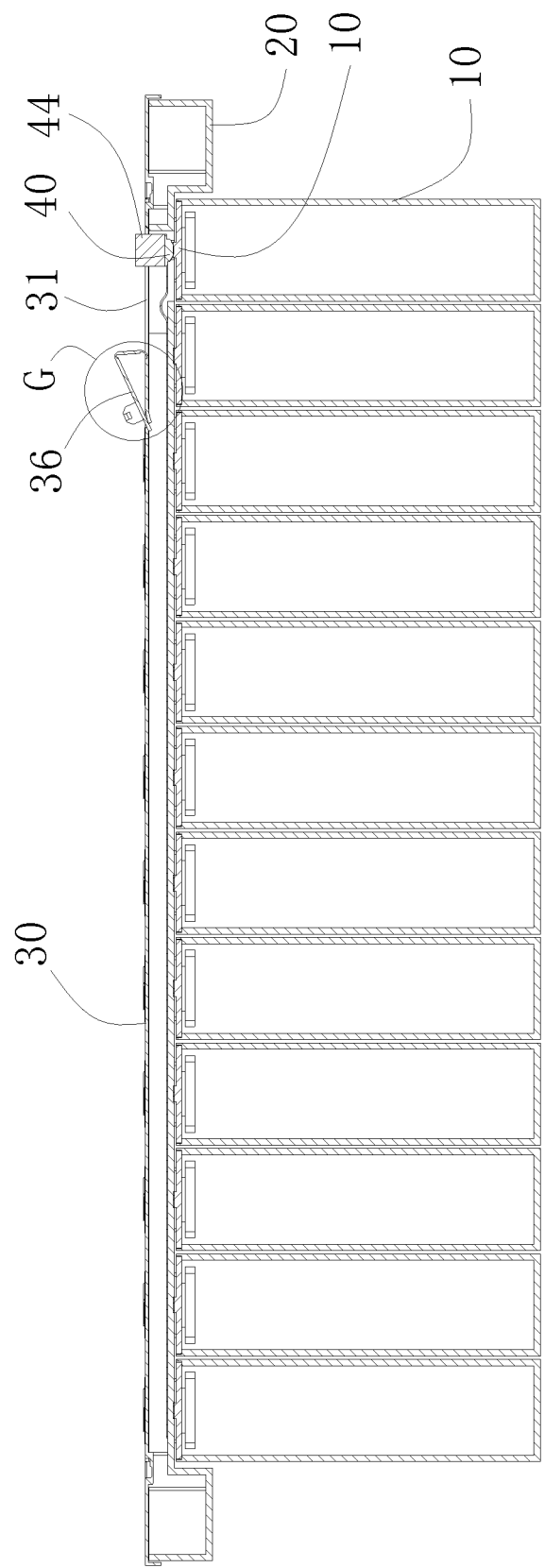
FIG. 13 is a sectional view taken along a direction F-F in FIG. 12.
Figure 14:
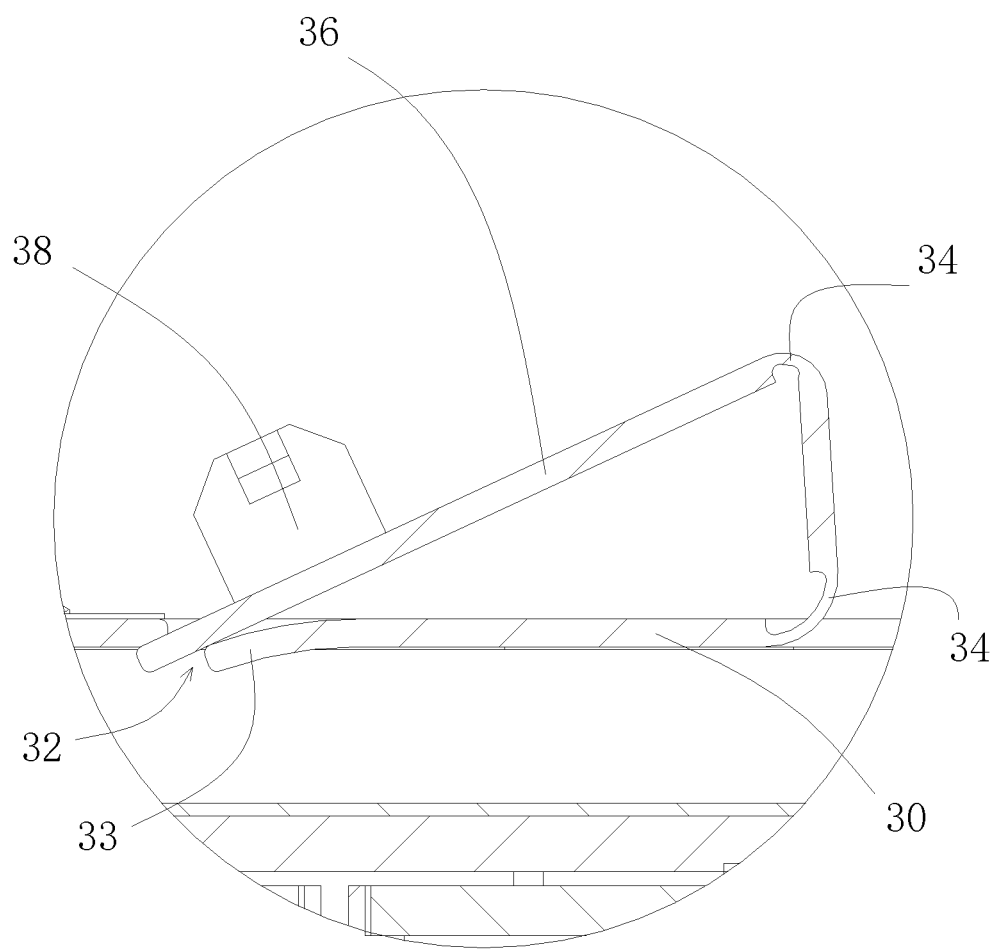
FIG. 14 is an enlarged schematic view at Gin FIG. 13.

In this embodiment, as shown in FIG. 6 and FIG. 10, the cover plate 30 and the openable and closable door 36 are integrated as a single piece. The cover plate 30 may be rotatably connected to the openable and closable door 36 via a bendable portion 34. One end of the openable and closable door 36 is connected to the cover plate 30 via a bendable portion 34, and the other end thereof is danglingly arranged as a free end. For example, the cover plate 30 and the openable and closable door 36 may be integrally molded or integrally arranged by other existing technologies.

The bendable portion 34 is sheet-shaped. The bendable portion 34 has a thickness smaller than that of the openable and closable door 36. Compared with the openable and closable door 36 and the cover plate 30, the bendable portion 34 is a leaf spring-shaped structure with a smaller thickness, and has better elastic deformability. The bendable portion 34 can be bent in a thickness direction and thus elastically deformed, so as to enable the openable and closable door 36 to rotate relative to the cover plate 30.

An angle at which the openable and closable door 36 is rotatable relative to the cover plate 30 may be specifically set as required. The quantity of the bendable portion 34 may be correspondingly set based on the angle. When the openable and closable door 36 is in the open position, an acute angle, a right angle, an obtuse angle or an included angle equal to or larger than 180 degrees may be formed between the openable and closable door 36 and the second through-hole 31, such that a part of the elastic member 44 passes out of the second through-hole 31. When the openable and closable door 36 is in the closed position, the openable and closable door 36 is arranged to be flush with the cover plate 30, such that the second through-hole 31 may be at least partially blocked. The quantity of the bendable portion 34 may be set as required. In this embodiment, one bendable portion 34 is arranged on the openable and closable door 36. The openable and closable door 36 may be rotated to the open position where a right angle is approximately formed between the openable and closable door 36 and the second through-hole 31.

Figure 8:
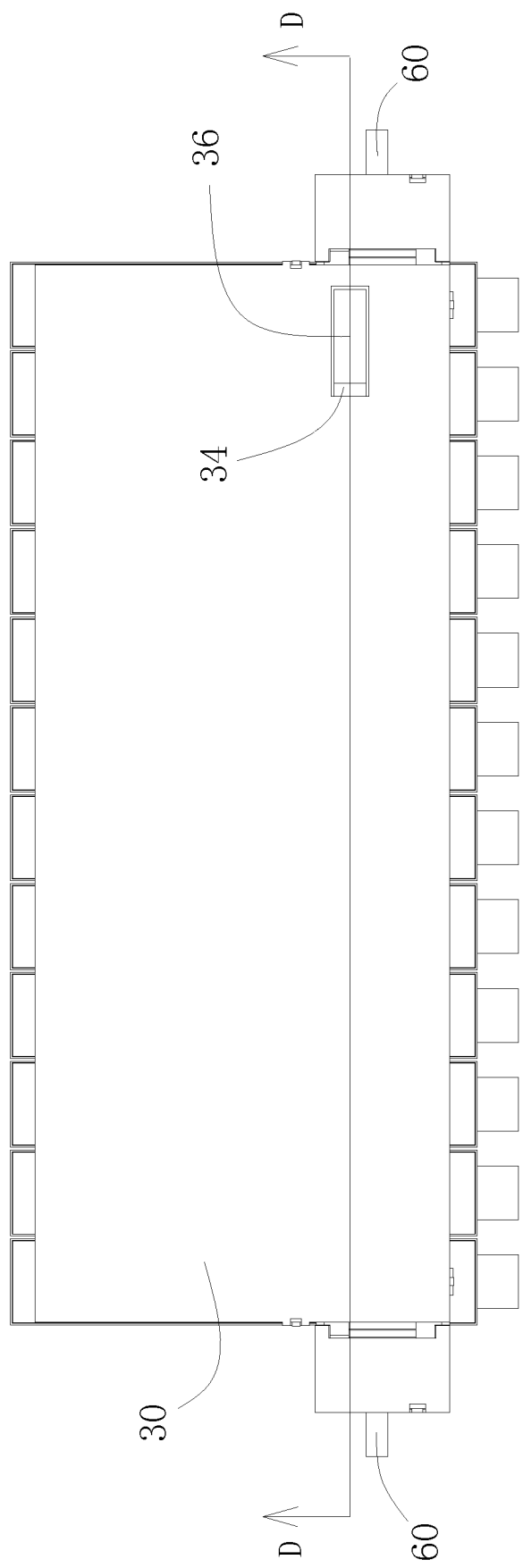
FIG. 8 is a top view of the battery module in FIG. 7.
Figure 9:
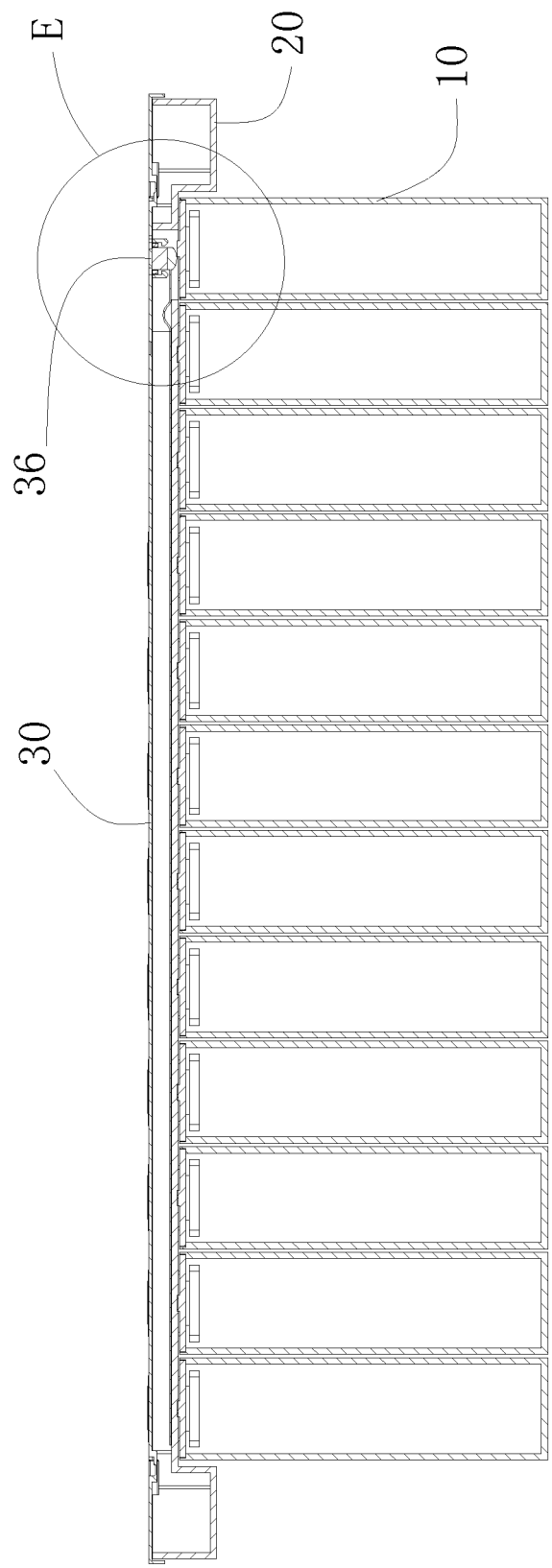
FIG. 9 is a sectional view taken along a D-D direction in FIG. 8.

When the openable and closable door 36 is in the closed position, the openable and closable door 36 is connected to the housing body 20 or the cover plate 30, so that the openable and closable door 36 does not rotate towards the outside of the second through-hole 31, and as a result, the openable and closable door 36 cannot keep the elastic member 44 deformed. In this embodiment, as shown in FIG. 8 to FIG. 10, when being rotated to the closed position, the openable and closable door 36 is connected to the housing body 20 in a snap-fitted manner to prevent the openable and closable door 36 from rotating towards the outside of the second through-hole 31. Specifically, an elastic hook 38 is protrudingly provided on the openable and closable door 36. A blocking portion 26 is arranged on the housing body 20. When the openable and closable door 36 is rotated from the open position to the closed position, the elastic hook 38 elastically deforms and moves over the blocking portion 26, and the elastic hook 38 is snap-fitted with the blocking portion 26. The blocking portion 26 stops the elastic hook 38 to prevent the openable and closable door 36 from rotating towards the outside of the second through-hole 31.

The shape of the housing body 20 may be specifically set as required, provided that the cover plate 30 can cover the housing body 20. In this embodiment, the cover plate 30 covers the housing body 20, the cover plate 30 and the housing body 20 define a receiving cavity. The first through-hole 22 is connected to the receiving cavity. As shown in FIG. 2, the housing body 20 comprises a bottom wall and a side wall protruding beyond the bottom wall. The cover plate 30, the bottom wall, and the side wall define the receiving cavity together.

When the openable and closable door 36 is in the open position, a part of the elastic member 44 is located in the receiving cavity, and a part thereof passes out of the second through-hole 31. When the openable and closable door 36 is in the closed position, the elastic member 44 is compressed in the case by the openable and closable door 36. As the openable and closable door 36 is switched between the open position and the closed position, the elastic member 44 is elastically released or compressed. As shown in FIG. 2, to position the mounting position of the elastic member 44, the housing body 20 is inwardly protrudingly provided with a positioning bracket 24. For example, the positioning bracket 24 may protrude inwardly from the bottom wall or the side wall of the housing body 20. The positioning bracket 24 is located on a circumferential side of the elastic member 44 and retains the elastic member 44. The positioning bracket 24 retains the elastic member 44 and may guide the deformation of the elastic member 44 to prevent the elastic member 44 from displacement. The blocking portion 26 may be fixedly arranged on the positioning bracket 24.

The busbar 50 may be at least partially accommodated in the receiving cavity. The positive terminal and the negative terminal may extend into the receiving cavity from the cell 10 through the first through-hole 22. The positive terminal and the negative terminal may be electrically connected to the busbar 50 in the receiving cavity. The positive terminal and the negative terminal are respectively mounted on the housing body 20. The positive terminal and the negative terminal are partially located in the receiving cavity and partially pass out of the receiving cavity for connecting to an external conductive member.

When the openable and closable door 36 is in the open position, the mounting positions and states of the temperature sensor 40 and the elastic member 44 may be examined through the opened second through-hole 31. Especially, a contact state between the temperature sensor 40 and the cell 10 is examined. When the openable and closable door 36 is in the closed position, it can be ensured that the temperature sensor 40 is in full contact with the cell 10 to reliably detect the temperature of the cell 10. The openable and closable door 36 and the cover plate 30 may be integrated as a single piece, so that the quantity of parts to be assembled is reduced, and a mounting procedure is simplified. The openable and closable door 36 in the closed position is not higher than the cover plate 30. The overall height of the battery module 100 can be smaller.

Embodiment 2

Referring to FIGS. 11 to 14, a battery module 100 according to Embodiment 2 of the present application is shown. Different from Embodiment 1, at least two of the bendable portions 34 are arranged on the openable and closable door 36. One end of the openable and closable door 36 is connected to the cover plate 30 via the at least two bendable portions 34, and the other end thereof is danglingly arranged as a free end. The at least two bendable portions 34 are arranged at intervals along the length direction of the openable and closable door 36. The at least two bendable portions 34 can both be bent in the thickness direction and elastically deformed. The at least two bendable portions 34 are bent and thus deformed at the same time, so that the openable and closable door 36 can be rotated to the open position where an included angle larger than 180 degrees is formed between the openable and closable door and the second through-hole. In this embodiment, two bendable portions 34 are provided. The two bendable portions 34 are arranged at intervals along the length direction of the openable and closable door 36.

The other end of the openable and closable door 36 is also connected to the cover plate 30. Specifically, a slot 32 is provided in an outer surface of the cover plate 30. The slot 32 may be arranged to pass through the cover plate 30 along the thickness direction. The cover plate 30 is provided with an elastic cantilever 33 protruding into the slot 32. One end of the elastic cantilever 33 is connected to the cover plate 30 and is a fixed end, and the other end thereof is danglingly located in the slot 32. When the openable and closable door 36 is in the open position, the other end of the openable and closable door 36 is inserted into the slot 32 and presses a free end of the elastic cantilever 33, so that the elastic cantilever 33 can be elastically deformed. The deformed elastic cantilever 33 enables the openable and closable door 36 to be pressed against an inner surface of the slot 32.

Figure 15:
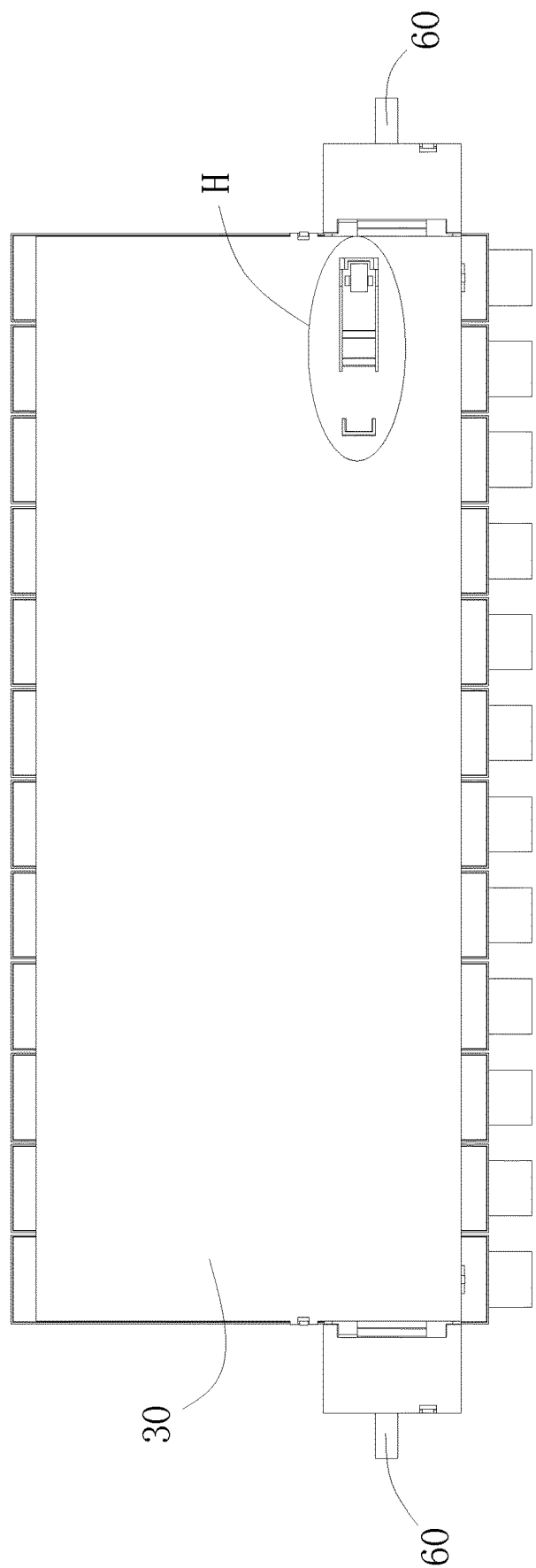
FIG. 15 is a top view with an openable and closable door of the battery module in FIG. 11 being in a closed position.
Figure 16:
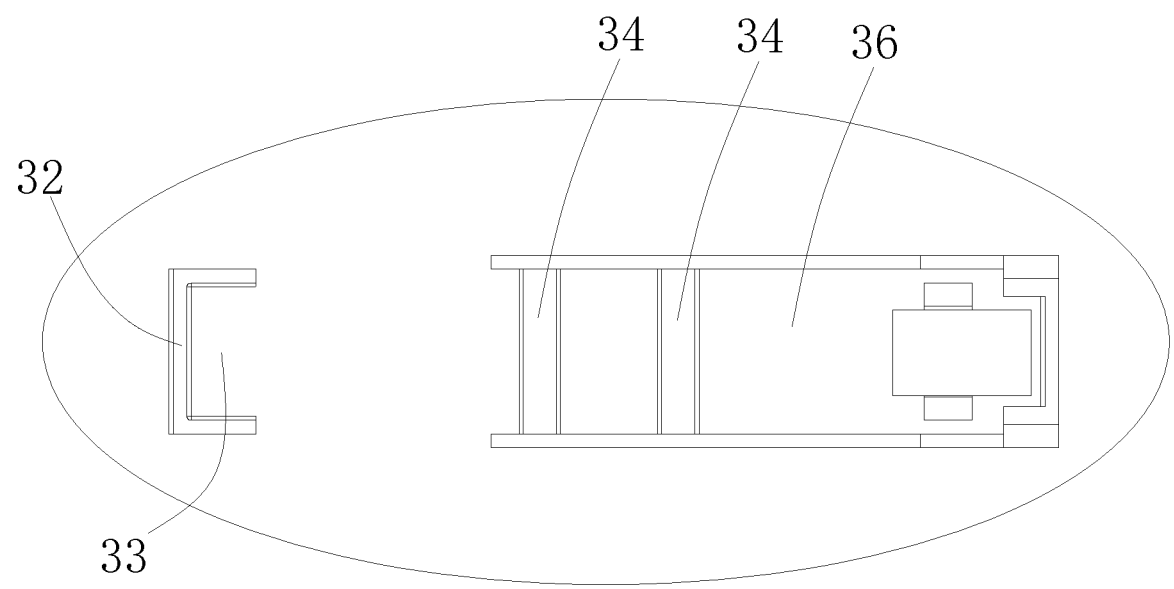
FIG. 16 is an enlarged schematic view at H in FIG. 15.

Referring to FIG. 15 and FIG. 16, when the openable and closable door 36 needs to be rotated from the open position to the closed position, an external force is applied to a certain extent to overcome the pressing force of the elastic cantilever 33, such that the openable and closable door 36 can be detached from the slot 32. The openable and closable door 36 is then rotated to the closed position.

When the openable and closable door 36 is in the open position, two ends of the openable and closable door 36 are both connected to the cover plate 30 and are fixedly arranged. In transportation and assembly procedures, the openable and closable door 36 is fixed onto the cover plate 30 and does not move freely to affect other components.

By providing at least two bendable portions 34, an included angle larger than 180 degrees can be formed between the openable and closable door 36 in the open position and the second through-hole 31. The openable and closable door 36 occupies a small space in a height direction, so that the overall height of the battery module 100 can be reduced. The openable and closable door 36 and the cover plate 30 may even be basically in the same plane in the height direction, so that the overall height of the battery module 100 is further reduced.

The foregoing is merely preferred embodiments of the present application and is not intended to limit the protect scope of the present application. Any modifications, equivalents or improvements within the spirit of the present application shall be encompassed within the scope of the claims of the present application.

The invention claimed is:

1. A connection assembly for a battery module, comprising:
 a housing body, the housing body being used for supporting a plurality of components;
 a cover plate, the cover plate being adapted to cover the housing body and used for covering the plurality of components on the housing body, and the cover plate being provided with a second through-hole, the second through-hole positionally corresponding to at least one of the plurality of components;
 a temperature sensor, the temperature sensor being supported on the housing body for sensing the temperature of a cell, the position of the temperature sensor being aligned with the position of the second through-hole;
 the housing body is provided with a first through-hole, the first through-hole being arranged to pass through the housing body, and to correspond to the second through-hole; the temperature sensor is at least partially located in the first through-hole to sense the temperature of the cell; and
 an openable and closable door, the openable and closable door being movably mounted on the cover plate, and being positionally changeable between an open position and a closed position,
 wherein in the open position, the openable and closable door opens the second through-hole to expose the at least one of the plurality of components; and in the closed position, the openable and closable door shields at least part of the second through-hole to cover the at least one of the plurality of components on the housing body.

2. The connection assembly according to claim 1, wherein
 the cover plate and the openable and closable door are integrated as a single piece; one end of the openable and closable door is connected to the cover plate via a bendable portion, and the other end thereof is danglingly arranged; and
 the bendable portion is configured to be bendable to deform, such that the openable and closable door moves relative to the cover plate.

3. The connection assembly according to claim 2, wherein
 the bendable portion is sheet-shaped, and the bendable portion has a thickness smaller than that of the openable and closable door.

4. The connection assembly according to claim 2, wherein one bendable portion is provided.

5. The connection assembly according to claim 2, wherein
 at least two bendable portions are provided; and
 the at least two bendable portions are arranged at intervals in the length direction of the openable and closable door.

6. The connection assembly according to claim 5, wherein
 the at least two bendable portions are configured to enable the openable and closable door to rotate to the open position where an included angle larger than 180 degrees is formed between the openable and closable door and the second through-hole; and
 the other end of the openable and closable door is connected to the cover plate.

7. The connection assembly according to claim 6, wherein
 a slot is provided in the cover plate; and
 in the open position, the other end of the openable and closable door is inserted into the slot.

8. The connection assembly according to claim 7, wherein
 the slot is U-shaped, forming a pair of elastic cantilevers; and
 in the open position, the elastic cantilevers are elastically deformed, such that the openable and closable door is pressed against an inner surface of the slot.

9. The connection assembly according to claim 1, wherein
 in the closed position, the openable and closable door is arranged to be flush with the cover plate.

10. The connection assembly according to claim 1, further comprising a fixing structure, wherein
 in the closed position, the fixing structure connects the openable and closable door with the housing body or the cover plate to prevent the openable and closable door from rotating towards the outside of the second through-hole.

11. The connection assembly according to claim 10, wherein
 the fixing structure comprises a snap fastener; and
 in the closed position, the openable and closable door is connected to the housing body via the snap fastener, to prevent the openable and closable door from rotating towards the outside of the second through-hole.

12. The connection assembly according to claim 9, wherein
 the openable and closable door is protrudingly provided with an elastic hook;

a blocking portion is arranged on the housing body; and in the closed position, the blocking portion is snap-fitted with the elastic hook to prevent the openable and closable door from rotating towards the outside of the second through-hole.

13. The connection assembly according to claim 1, wherein an elastic member arranged on the temperature sensor is supported on the housing body, the elastic member is a foam material.

14. The connection assembly according to claim 13, wherein the temperature sensor is fixedly connected to the elastic member.

15. The connection assembly according to claim 13, wherein the housing body is protrudingly provided with a positioning bracket; and the positioning bracket retains the elastic member.

16. The connection assembly according to claim 1, wherein the cover plate and the openable and closable door are integrally molded as a single piece.

17. A battery module assembly, comprising:

a plurality of cells; and a connection assembly comprising:

a housing body, the housing body being used for supporting a plurality of components, the housing body having a first through-hole, the first through-hole being arranged to pass through the housing body to allow at least one of the plurality of components to connect to a cell of the battery module;

a cover plate, the cover plate being adapted to cover the housing body and used for covering the plurality of components on the housing body, and the cover plate being provided with a second through-hole, the second through-hole positionally corresponding to at least one of the plurality of components; and an openable and closable door, the openable and closable door being movably mounted on the cover plate, and being positionally changeable between an open position and a closed position, wherein in the open position, the openable and closable door opens the second through-hole to expose the at least one of the plurality of components; and in the closed position, the openable and closable door shields at least part of the second through-hole to cover the at least one of the plurality of components on the housing body;

wherein the plurality of cells are electrically connected via a bus bar to form the battery module.

18. The battery module assembly according to claim 17, wherein the plurality of cells are connected in series or parallel via the busbar to form the battery module; and each of the cells is provided with a positive terminal and a negative terminal electrically connected to the busbar.

19. The battery module assembly according to claim 18, further comprising a power supply terminal, the power supply terminal being electrically connected to the plurality of cells via the busbar.

20. A connection assembly for a battery module, comprising:

a housing body, the housing body being used for supporting a plurality of components;

a cover plate, the cover plate being adapted to cover the housing body and used for covering the plurality of components on the housing body, and the cover plate being provided with a second through-hole, the second through-hole positionally corresponding to at least one of the plurality of components;

a temperature sensor, the temperature sensor being supported on the housing body for sensing the temperature of a cell, the position of the temperature sensor being aligned with the position of the second through-hole;

an elastic member arranged on the temperature sensor; and an openable and closable door, the openable and closable door being movably mounted on the cover plate, and being positionally changeable between an open position and a closed position, wherein in the open position, the openable and closable door opens the second through-hole to expose the at least one of the plurality of components and a part of the elastic member passes out of the second through-hole;

in the closed position, the openable and closable door shields at least part of the second through-hole to cover the at least one of the plurality of components on the housing body and the elastic member is located between the temperature sensor and the openable and closable door; and the openable and closable door elastically deforms the elastic member, so as to press the temperature sensor to come into contract with the cell and detect the temperature of the cell.

* * * * *